(12) United States Patent
Noda

(10) Patent No.: US 11,354,112 B2
(45) Date of Patent: Jun. 7, 2022

(54) ON-BOARD UPDATE DEVICE, UPDATE PROCESS METHOD, AND UPDATE PROCESS PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Tetsuya Noda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/044,406

(22) PCT Filed: May 8, 2019

(86) PCT No.: PCT/JP2019/018328
§ 371 (c)(1),
(2) Date: Oct. 1, 2020

(87) PCT Pub. No.: WO2019/216330
PCT Pub. Date: Nov. 14, 2019

(65) Prior Publication Data
US 2021/0117177 A1    Apr. 22, 2021

(30) Foreign Application Priority Data
May 11, 2018   (JP) .............................. JP2018-092554

(51) Int. Cl.
*G06F 8/65* (2018.01)
*B60R 16/023* (2006.01)
*G06F 9/52* (2006.01)

(52) U.S. Cl.
CPC ............ *G06F 8/65* (2013.01); *B60R 16/0231* (2013.01); *G06F 9/52* (2013.01)

(58) Field of Classification Search
CPC .......... G06F 8/65; G06F 9/52; B60R 16/0231
See application file for complete search history.

(56) References Cited

U.S. PATENT DOCUMENTS

| | | | | |
|---|---|---|---|---|
| 6,658,330 | B2 * | 12/2003 | Delaruelle | B61L 15/0027 455/418 |
| 10,908,890 | B2 * | 2/2021 | Nakamura | G06F 11/00 |

(Continued)

FOREIGN PATENT DOCUMENTS

| | | |
|---|---|---|
| JP | 2018-046515 A | 3/2018 |
| JP | 2019-020866 A | 2/2019 |

OTHER PUBLICATIONS

Lee et al., "A Parallel Re-programming Method for In-vehicle Gateway to save software update time" (Year: 2015).*

(Continued)

*Primary Examiner* — Phillip H Nguyen
(74) *Attorney, Agent, or Firm* — Honigman LLP

(57) ABSTRACT

Provided are an on-board update device, an update process method, and an update process program capable of appropriately updating a plurality of on-board devices installed in a vehicle if a plurality of update processes are provided through different paths. The on-board update device according to this embodiment performs communication via external communication units, and includes an execution determination unit configured to determine, if different update programs are respectively received from different external devices via a plurality of external communication units, based on version information of the update programs, whether or not it is possible to perform an update process using each update program, and, if the execution determination unit has determined that it is possible to perform (Continued)

update processes with regard to a plurality of update programs, an update process unit performs update processes using the plurality of update programs in parallel.

10 Claims, 11 Drawing Sheets

(56) References Cited

U.S. PATENT DOCUMENTS

| | | | |
|---|---|---|---|
| 10,999,078 B2* | 5/2021 | Kawabata | G06F 8/61 |
| 11,144,295 B2* | 10/2021 | Arai | B60R 16/02 |
| 2004/0083053 A1* | 4/2004 | Ohno | G01C 21/26 |
| | | | 701/454 |
| 2013/0104120 A1 | 4/2013 | Arrizza et al. | |
| 2017/0024534 A1 | 1/2017 | Arrizza et al. | |
| 2017/0286637 A1 | 10/2017 | Arrizza et al. | |
| 2018/0032324 A1* | 2/2018 | Sarkar | G06F 8/65 |
| 2018/0081671 A1 | 3/2018 | Naruse et al. | |
| 2019/0235855 A1* | 8/2019 | Nakano | G06F 13/4204 |
| 2019/0256109 A1* | 8/2019 | Izumi | B60R 16/02 |

OTHER PUBLICATIONS

International Search Report, Application No. PCT/JP2019/018328, dated Jun. 11, 2019. ISA/Japan Patent Office.

* cited by examiner

Version correspondence information of on-board system 2A

| System version | Device version ||
|---|---|---|
| | ECU2a | ECU2b |
| 1 | 1 | 1 |
| 2 | 2 | 1 |

| System version | Device version ||
|---|---|---|
| | ECU2a | ECU2b |
| 3 | 3 | 2 |

| System version | Device version ||
|---|---|---|
| | ECU2a | ECU2b |
| 1 | 1 | 1 |
| 2 | 2 | 1 |
| 3 | 3 | 2 |

FIG. 5

| System version | Device version | |
| --- | --- | --- |
| | ECU2a | ECU2b |
| 1 | 1 | 1 |
| 2 | 2 | 1 |
| 3 | 3 | 2 |

From server device  From diagnostic tool

⇩

Both update processes can be performed in parallel

FIG. 6

| System version | Device version ||
|---|---|---|
| | ECU2a | ECU2b |
| 1 | 1 | 1 |
| 2 | 2 | 1 |
| 3 | 3 | 2 |
| 4 | 4 | 3 |

From server device     From diagnostic tool

⇓

Both update processes cannot be performed in parallel

| System version | Device version | |
|---|---|---|
| | ECU2a | ECU2b |
| 1 | 1 | 1 |
| 2 | 2 | 1 |
| 3 | 3 | 2 |
| 4 | 3 | 3 |

From server device    From diagnostic tool

Both update processes can be performed in parallel

ON-BOARD UPDATE DEVICE, UPDATE PROCESS METHOD, AND UPDATE PROCESS PROGRAM

CROSS-REFERENCE TO RELATED APPLICATIONS

This application is the U.S. national stage of PCT/JP2019/018328 filed on May 8, 2019, which claims priority of Japanese Patent Application No. JP 2018-092554 filed on May 11, 2018, the contents of which are incorporated herein.

TECHNICAL FIELD

The present disclosure relates to an on-board update device, an update process method, and an update process program, for updating programs or data in on-board devices installed in a vehicle.

BACKGROUND

A vehicle is conventionally equipped with a plurality of on-board devices such as ECUs (Electronic Control Units), which are connected via communication lines such as CAN (Controller Area Network) buses and thereby capable of transmitting and receiving information to/from each other. In each ECU that is in charge of vehicle control or a like process, a processor such as a CPU (Central Processing Unit) retrieves and executes a program stored in a storage unit such as a flash memory or EEPROM (Electrically Erasable Programmable Read Only Memory). The program or data stored in the storage unit of each ECU needs to be updated with a new program or data, for example, when it is required to add a function, to correct a fault, to upgrade, etc. In this case, an update program or data is transmitted via a communication line to the ECU to be updated.

In a program rewriting device proposed by JP 2016-188016A, current version information that is rewritable and retrieved from all the ECUs included in a network and the newest version information corresponding to the current version information are compared, ECUs whose version information does not match the newest version information are extracted as ECUs to be updated, and program rewriting operations are successively executed on the extracted ECUs in the order of priorities stored in an order DB (database).

The program rewriting device disclosed in JP 2016-188016A is provided at a vehicle dealer or a maintenance shop, for example, and the program rewriting device is configured to transmit a program for updating ECUs to a gateway of the vehicle after the program rewriting device is connected to a connector provided in the vehicle with a cable. In contrast, in recent years, so-called remote programming technology has been studied and developed in which ECUs of a vehicle are updated as a result of a server device transmitting a program for updating ECUs to the vehicle through wireless communication between the vehicle and the server device. If a vehicle is provided with the function of performing an update process through remote programming and the function of performing an update process by connecting a program rewriting device or the like with a cable, requests for performing both update processes may be made simultaneously. A request for one function to perform an update process may be made while the other function performs an update process, for example. Conventionally, studies have not been conducted on how to handle such cases.

The present disclosure is made in view of such circumstances, and intends to provide an on-board update device, an update process method, and an update process program capable of appropriately updating a plurality of on-board devices installed in a vehicle if a plurality of update processes are provided through different paths.

SUMMARY

An on-board update device according to this aspect includes a plurality of external communication units configured to communicate with a device outside a vehicle, an in-vehicle communication unit configured to communicate with a plurality of on-board devices installed in the vehicle, and an update process unit configured to receive, from the external device and via the external communication units, an update program for updating a program that is stored in a storage unit of the on-board device, and to transmit the update program via the in-vehicle communication unit to the on-board device. The on-board update device includes an execution determination unit configured to determine, if different update programs are respectively received from different external devices via a plurality of the external communication units, based on version information of the update programs, whether or not it is possible to perform an update process using each update program. If the execution determination unit has determined that it is possible to perform update processes with regard to a plurality of update programs, the update process unit performs update processes using the plurality of update programs in parallel.

An update process method according to this aspect is an update process method for receiving, from a device outside a vehicle, an update program for updating a program that is stored in a storage unit of an on-board device, and for transmitting the received update program to the on-board device. If different update programs are respectively received from a plurality of different external devices, whether or not it is possible to perform an update process using each update program is determined based on version information of the update programs, and if it is determined that it is possible to perform update processes with regard to a plurality of update programs, update processes are performed in parallel using the plurality of update programs.

An update process program according to this aspect is an update process program for causing a computer to perform processing for receiving, from a device outside a vehicle, an update program for updating a program that is stored in a storage unit of an on-board device, and for transmitting the received update program to the on-board device. The update process program causes the computer to perform processing for determining, if different update programs are respectively received from different external devices, based on version information of the update programs, whether or not it is possible to perform an update process using each update program, and if it is determined that it is possible to perform update processes with regard to a plurality of update programs, performing update processes using the plurality of update programs in parallel.

Note that this application can be realized as not only an on-board update device including such characteristic processing units but also an update process method including such characteristic processes as steps or an update process program for causing a computer to execute these steps. Also, this application can be realized as a semiconductor integrated circuit for realizing part or the entirety of the on-board update device or as another device or a system including the on-board update device.

Advantageous Effects of Disclosure

According to the above configuration, it is possible to suitably update a plurality of on-board devices installed in a vehicle if a plurality of update processes are provided through different paths.

BRIEF DESCRIPTION OF DRAWINGS

FIG. 5 is a schematic diagram illustrating the determination of whether or not it is possible to perform an update process.

FIG. 6 is a schematic diagram illustrating the determination of whether or not it is possible to perform an update process.

DETAILED DESCRIPTION OF PREFERRED EMBODIMENTS

Figure 1:
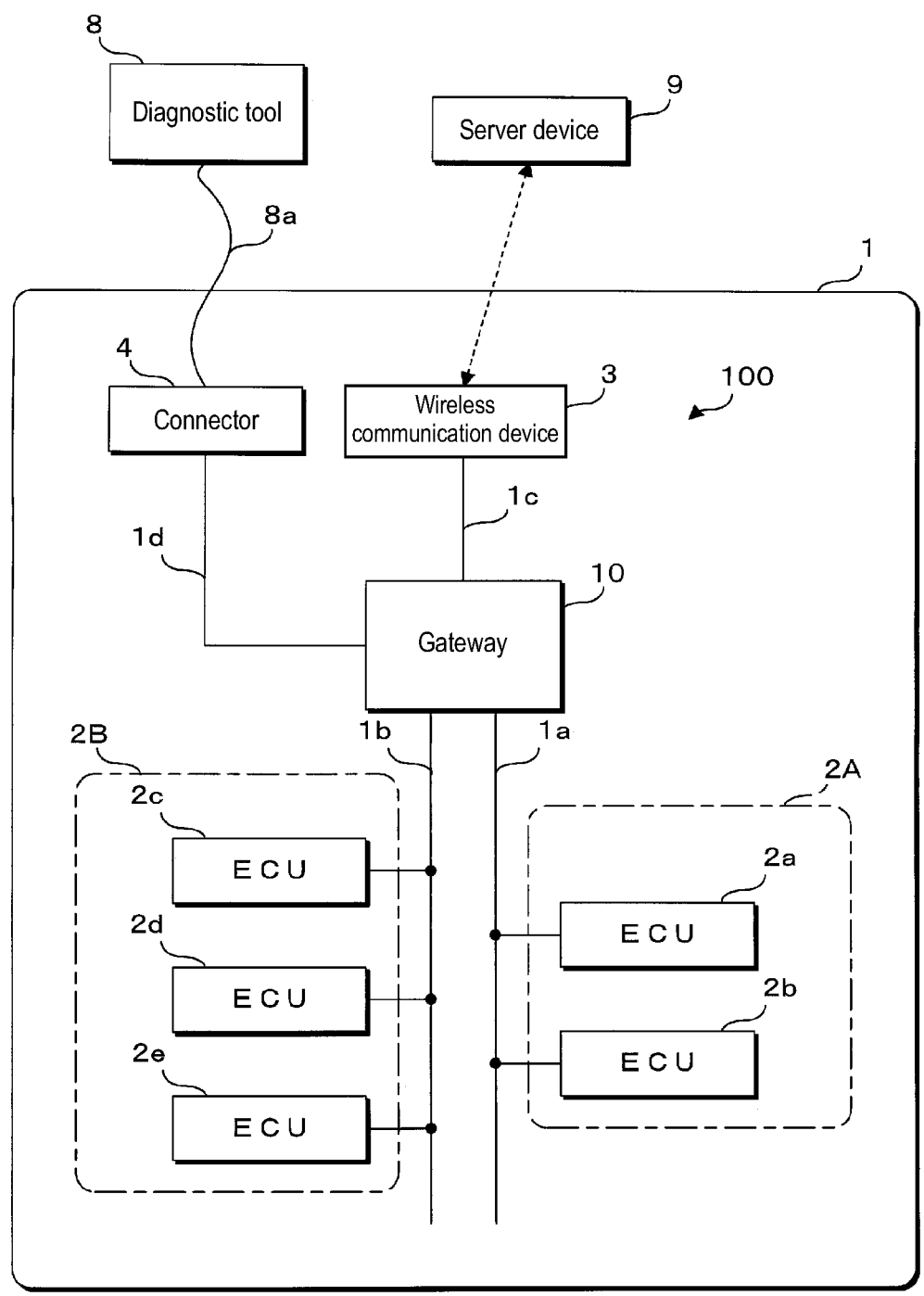
FIG. 1 is a schematic diagram showing a configuration of an on-board update system according to this embodiment.

Embodiments of this disclosure will be first described. At least some embodiments described below may also be combined.

An on-board update device according to this aspect includes a plurality of external communication units configured to communicate with a device outside a vehicle, an in-vehicle communication unit configured to communicate with a plurality of on-board devices installed in the vehicle, and an update process unit configured to receive, from the external device and via the external communication unit, an update program for updating a program that is stored in a storage unit of the on-board device, and to transmit the update program via the in-vehicle communication unit to the on-board device. The on-board update device includes an execution determination unit configured to determine, if different update programs are respectively received from different external devices via a plurality of the external communication units, based on version information of the update programs, whether or not it is possible to perform an update process using each update program. If the execution determination unit has determined that it is possible to perform update processes with regard to a plurality of update programs, the update process unit performs update processes using the plurality of update programs in parallel.

In this aspect, the on-board update device for updating programs of a plurality of on-board devices installed in the vehicle can communicate with a device outside the vehicle through a plurality of wired or wireless communication paths. The on-board update device updates a program that is stored in the on-board device by receiving an update program for updating the on-board device from the external device and transmitting the update program to the on-board device through in-vehicle communication. The on-board update device acquires version information of the update program together with the update program from the external device. If the on-board update device has received different update programs from different external devices, the on-board update device determines whether or not it is possible to perform update processes using the update programs, based on the version information. If it is determined that it is possible to perform update processes using a plurality of update programs, the on-board update device performs update processes using these update programs in parallel.

Accordingly, if the on-board update device has received a plurality of update programs from different external devices, the on-board update device can appropriately determine whether or not it is possible to perform update processes using the update programs, based on the version information, and can perform the plurality of update processes in parallel.

It is preferable that the version information includes a system version assigned to an on-board system including, as one group, a plurality of on-board devices that operate together, and device versions that are respectively assigned to the on-board devices, the on-board update device includes a storage unit configured to store a correspondence relationship between the system version and the device versions, and if a plurality of update programs are used to update on-board devices included in different on-board systems, the execution determination unit determines that it is possible to perform update processes using the plurality of update programs.

In this aspect, version information acquired from an external device together with an update program includes a system version assigned to an on-board system including, as one group, a plurality of on-board devices that operate together, and device versions that are respectively assigned to the on-board devices. The on-board update device stores a correspondence relationship between the system version and the device versions. Accordingly, the on-board update device can appropriately find out the correspondence relationship between the system version and device versions, and appropriately determine whether or not it is possible to perform an update process using an update program.

If a plurality of update programs assigned from a plurality of external devices are used to update on-board devices included in different on-board systems, for example, the on-board update device performs update processes using these update programs in parallel. Because there is no version dependency between the on-board devices included in different on-board systems, it is possible to perform update processes in parallel regardless of the system version and the device versions.

It is preferable that the execution determination unit determines that it is possible to perform update processes using a plurality of update programs having the same system version.

In this aspect, if a plurality of update programs assigned from a plurality of external devices are used to update on-board devices included in a shared on-board system, for example, the on-board update device compares system versions of the plurality of update programs. If a plurality of update programs have the same system version, the on-board update device performs update processes using these update programs in parallel. Because programs executed by the plurality of on-board devices included in the on-board system preferably have the same system version, the on-board update device can determine that it is possible to perform update processes in parallel with regard to the update programs having the same system version.

It is preferable that, with regard to a plurality of update programs having different system versions, the execution determination unit is configured to give priority to an update process using one update program with which the update process has been started first, and to determine that it is impossible to perform update processes using the other update programs.

In this aspect, if a plurality of update programs provided by a plurality of external devices have different system versions, the on-board update device gives priority to an update process using an update program with which the update process has been started first, and determines that it is impossible to perform an update process using the update program that has been received later. This can prevent failure and the like caused as a result of the update process that has already been started being forcibly terminated during the update process.

It is preferable that, with regard to a plurality of update programs having different system versions, the execution determination unit is configured to give priority to an update process using one update program having the newest system version, and to determine that it is impossible to perform update processes using the other update programs.

In this aspect, if the plurality of update programs provided by the plurality of external devices have different system versions, the on-board update device gives priority to an update process using the update program having the newest system version, and determines that it is impossible to perform update processes using the other update programs. Accordingly, the on-board update device can update the version of the program of the on-board device to the newest system version.

It is preferable that, if device versions of the other update programs are the same as a device version corresponding to the system version for which priority is given to perform an update process, the execution determination unit determines that it is possible to perform update processes using the other update programs in parallel.

In this aspect, even if a plurality of update programs provided by a plurality of external devices have different system versions and it is to be determined that it is impossible to perform update processes using these update programs, if the device version of this update program is the same as a device version corresponding to the system version for which priority is given to perform an update process, it is possible to perform update processes using these update programs in parallel. In an exceptional case where a plurality of update programs have the same corresponding device version even if the update programs have different system versions, it is possible to more efficiently perform update processes as a result of the on-board update device determining that it is possible to perform the update processes.

An update process method according to this aspect is an update process method for receiving, from a device outside the vehicle, an update program for updating a program that is stored in a storage unit of an on-board device, and for transmitting the received update program to the on-board device. If different update programs are respectively received from different external devices, whether or not it is possible to perform an update process using each update program is determined based on version information of the update programs, and if it is determined that it is possible to perform update processes with regard to a plurality of update programs, update processes are performed using the plurality of update programs in parallel.

In this aspect, in a manner similar to that of Aspect (1), if a plurality of update programs have been received from different external devices, it is possible to appropriately determine whether or not it is possible to perform update processes using the update programs, based on the version information, and to perform the plurality of update processes in parallel.

An update process program according to this aspect is an update process program for causing a computer to perform processing for receiving, from a device outside a vehicle, an update program for updating a program that is stored in a storage unit of an on-board device, and for transmitting the received update program to the on-board device. The update process program causes the computer to perform processing for determining, if different update programs are respectively received from different external devices, based on version information of the update programs, whether or not it is possible to perform an update process using each update program, and for performing, if it is determined that it is possible to perform update processes with regard to a plurality of update programs, update processes using the plurality of update programs in parallel.

In this aspect, in a manner similar to that of Aspect (1), if a plurality of update programs have been received from different external devices, it is possible to appropriately determine whether or not it is possible to perform update processes using the update programs, based on the version information, and to perform the plurality of update processes in parallel.

Specific examples of an on-board update system according to embodiments of this disclosure will be described with reference to the drawings. Note that the present disclosure is not limited to these examples, but is indicated by the scope of the claims, and all changes that come within the meaning and range of equivalency of the claims are intended to be embraced therein.

System Overview

FIG. 1 is a schematic diagram showing the configuration of an on-board update system according to this embodiment. An on-board update system 100 according to this embodiment includes a plurality of ECUs 2a to 2e, one wireless communication device 3, and one gateway 10 that are installed in a vehicle 1. The ECUs 2a to 2e are each connected to either a communication line 1a or 1b, and can communicate with each other via the connected communication line 1a or 1b. In the example shown in FIG. 1, two ECUs 2a and 2b are connected to the communication line 1a, three ECUs 2c to 2e are connected to the communication line 1b, and the two communication lines 1a and 1b are connected to the gateway 10. The gateway 10 relays communication between the communication lines 1a and 1b, and thereby the plurality of ECUs 2a to 2e enable communication via the communication lines 1a and 1b and the gateway 10.

Also, in the on-board update system 100 according to this embodiment, the wireless communication device 3 is connected to the gateway 10 via a communication line 1*c*. Via the wireless communication device 3, the gateway 10 can communicate with a server device 9 installed outside the vehicle 1. Also, a connector 4 for connecting an external device with a cable is provided in an appropriate portion of the vehicle 1, and the gateway 10 is connected to the connector 4 via a communication line 1*d*. A diagnostic tool 8 is detachably connected to the connector 4 via a communication cable 8*a*, for example. Accordingly, the gateway 10 can communicate with the diagnostic tool 8 via the communication line 1*d*, the connector 4, and the communication cable 8*a*.

The ECUs 2*a* to 2*e* may include various kinds of ECUs such as an ECU that controls the engine operation of the vehicle 1, an ECU that controls locking/unlocking of the doors, an ECU that controls on/off of the lighting, an ECU that controls the airbag operation, and an ECU that controls the ABS (Antilock Brake System) operation. Each of the ECUs 2*a* to 2*e* is connected to the communication line 1*a* or 1*b* arranged in the vehicle 1, and is capable of transmitting data to and receiving data from the other ECUs 2*a* to 2*e* and the gateway 10 via the communication lines 1*a* or 1*b*.

Also, in the vehicle 1 according to this embodiment, the functions of controlling the engine, locking of the doors, lighting, and the like are realized by the cooperation of a plurality of ECUs 2*a* to 2*e*. In the example shown in FIG. 1, the two ECUs 2*a* and 2*b* connected to the communication line 1*a* constitute an on-board system 2A for realizing one function through cooperation, and three ECUs 2*c* to 2*e* connected to the communication line 1*b* constitute an on-board system 2B for realizing one function through cooperation. The ECUs 2*a* and 2*b* realizes their functions through cooperation by performing processes, and exchanging information by transmitting the results of the processes through communication, and performing processes based on the information obtained through exchange of information, for example. Note that, although the on-board systems 2A and 2B are provided respectively for the communication lines 1*a* and 1*b* in this example, the present disclosure is not limited thereto, and a plurality of ECUs included in one on-board system may also be connected to different communication lines.

The wireless communication device 3 can communicate with the server device 9 installed outside the vehicle 1, for example, by wireless communication on a mobile telephone communication network, a wireless LAN (Local Area Network), or the like. The wireless communication device 3 can relay the communication between the gateway 10 and the server device 9, by transmitting the data provided by the gateway 10 to the server device 9 and providing the data received from the server device 9 to the gateway 10.

The gateway 10 is connected with the communication lines 1*a* to 1*d* that constitute an in-vehicle network for the vehicle 1, and relays data transmitted and received on these communication lines. In the example shown in FIG. 1, the gateway 10 is connected with four communication lines 1*a* to 1*d*, namely, the first communication line 1*a* connected with two ECUs 2*a* and 2*b*, the second communication line 1*b* connected with three ECUs 2*c* to 2*e*, the third communication line 1*c* connected with the wireless communication device 3, and the fourth communication line 1*d* connected with the connector. The gateway 10 relays data by receiving data from any of the communication lines 1*a* to 1*d* and transmitting the received data to the other communication lines 1*a* to 1*d*.

The server device 9 manages and stores the programs and data to be executed by the ECUs 2*a* to 2*e* installed in the vehicle 1. In response to an inquiry from the vehicle 1, the server device 9 informs the vehicle whether any program or the like needs updating. If an update is necessary, the server device 9 delivers an update program and data (simply referred to as an "update program" hereinafter) to the vehicle 1. Also, the server device 9 delivers the version information of the update program together with the update program.

The diagnostic tool 8 is provided at a dealer of the vehicle 1, maintenance shop, or the like, and is a device for an operator to examines defects of the vehicle 1, or change settings, for example. The diagnostic tool 8 is a portable device having an operation unit, a display unit, and the like, for example. After an operator connects the communication cable 8*a* of the diagnostic tool 8 to the connector 4 of the vehicle 1, and an appropriate authentication process or the like is performed, the diagnostic tool 8 and the gateway 10 of the vehicle 1 can then communicate with each other. The diagnostic tool 8 in this embodiment can transmit, to the vehicle 1, an update program for updating programs executed by the ECUs 2*a* to 2*e* installed in the vehicle 1. Also, the diagnostic tool 8 transmits the version information of the update program together with the update program.

In the on-board update system 100 according to this embodiment, the gateway 10 periodically communicates with the server device 9 via the wireless communication device 3, and checks whether a program or data stored in the ECUs 2*a* to 2*e* needs updating. If a program or data needs updating, the gateway 10 acquires an update program from the server device 9, and stores the acquired update program in a memory of the gateway 10. After the gateway 10 has acquired the update program, the gateway 10 transmits the update program to the ECUs 2*a* to 2*e* to be updated, via the communication lines 1*a* and 1*b*, and thereby updates the ECUs 2*a* to 2*e*. The ECUs 2*a* to 2*e* receive the update program transmitted from the gateway 10 and store the update program in their memories. After the ECUs 2*a* to 2*e* have received all the update programs, the ECUs 2*a* to 2*e* update their programs by changing the programs to be executed by the ECUs 2*a* to 2*e* to the update programs.

Also, the on-board update system 100 according to this embodiment can perform an update process using an update program acquired from the diagnostic tool 8, in addition to the above-described update process using the update program acquired from the server device 9. If an operator at a dealer of the vehicle 1, a maintenance shop, or the like inspects the vehicle 1 by connecting the diagnostic tool 8 thereto, and determines that it is necessary to update the programs of the ECUs 2*a* to 2*e*, for example, the operator may cause the diagnostic tool 8 to transmit an update program to the vehicle 1 so as to update the ECUs 2*a* to 2*e*. The diagnostic tool 8 transmits the update program to the vehicle 1 in response to the operation of the operator, and the gateway 10 receives the update program. The following update process is similar to that performed when an update program is acquired from the server device 9.

In the on-board update system 100 according to this embodiment, the gateway 10 may acquire an update program for updating the programs of the ECUs 2*a* to 2*e* from the server device 9 utilizing the wireless communication device 3, or may acquire their update programs from the diagnostic tool 8 connected to the connector 4. An update process using the update program received from the server device 9 may be started when a user goes to the dealer for the purpose of automobile inspection of the vehicle 1 or the like, and before the update process ends, an operator may perform the update process using the diagnostic tool 8 at the dealer, for example. Also, after an operator starts an update process using the diagnostic tool 8 at the dealer, an update process may be performed by automatic communication between the vehicle 1 and the server device 9, for example.

If a specific condition is met, the on-board update system 100 according to this embodiment can perform, in parallel, an update process using the update program acquired from the server device 9, and an update process using the update program acquired from the diagnostic tool 8. When the gateway 10 acquires an update program from the server device 9 or the diagnostic tool 8, the on-board update system 100 acquires the version information of the update program. The gateway 10 compares the version information of the update program acquired from the server device 9 and the version information of the update program acquired from the diagnostic tool 8, and thereby determines whether or not it is possible to perform update processes using these update programs in parallel. Also, if the gateway 10 has determined that it is impossible to perform update processes in parallel, the gateway 10 determines which update program needs to be given priority to perform the update process.

Device Configuration

Figure 2:
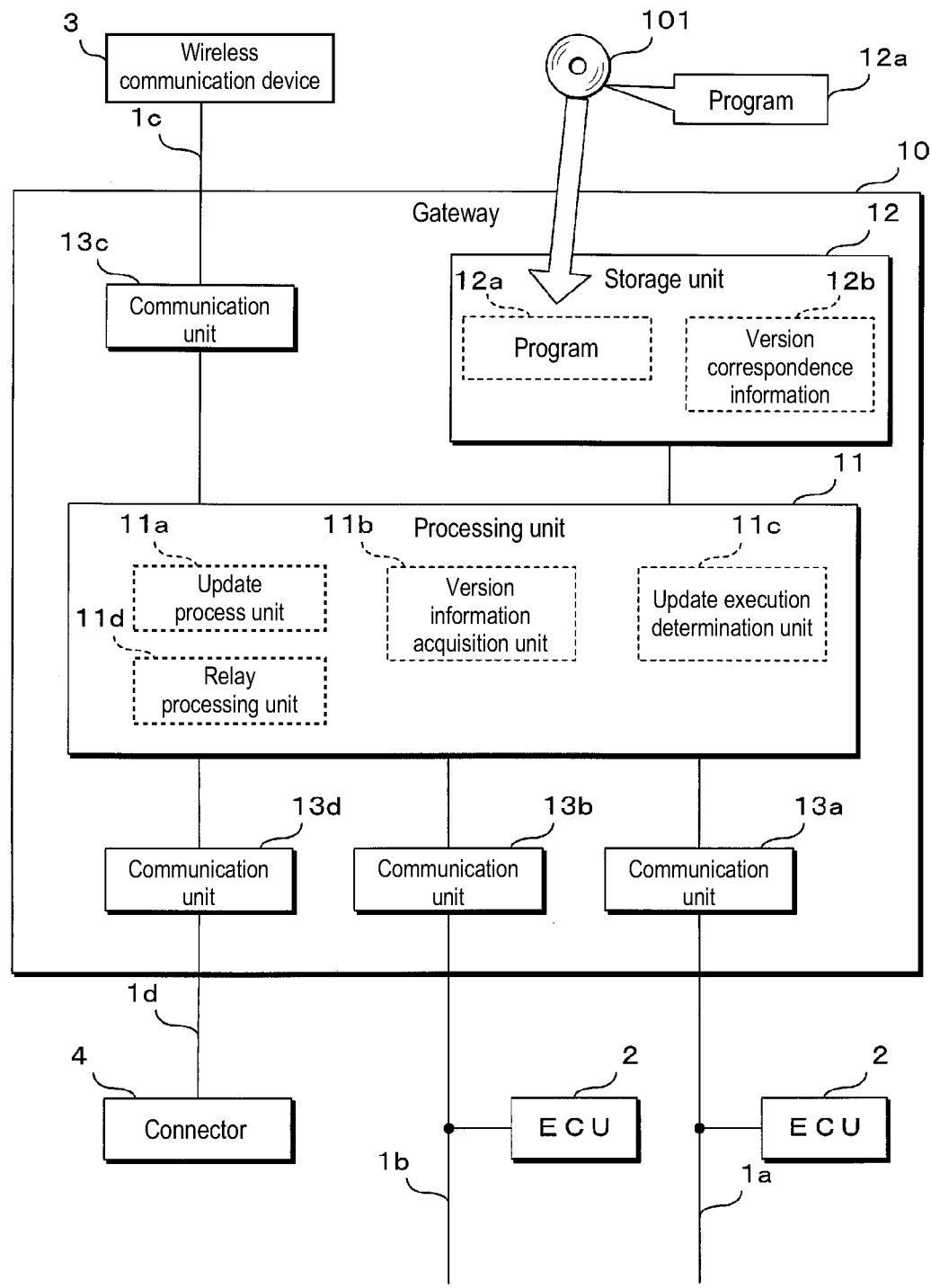
FIG. 2 is a block diagram showing a configuration of a gateway according to this embodiment.

FIG. 2 is a block diagram showing the configuration of the gateway 10 according to this embodiment. The gateway 10 according to this embodiment includes a processing unit (processor) 11, a storage unit (storage) 12, and communication units (transceivers) 13*a* to 13*d*, and the like. The processing unit 11 is constituted, for example, by an arithmetic processing unit such as a CPU (Central Processing Unit) or an MPU (Micro-Processing Unit). The processing unit 11 performs various arithmetic operations by retrieving and executing a program 12*a* stored in the storage unit 12. In this embodiment, the processing unit 11 performs arithmetic operations necessary for relaying transmission and reception of data between the communication lines 1*a* to 1*d* on the in-vehicle network, and updating the ECUs 2*a* to 2*e*, and the like.

The storage unit 12 is constituted by a non-volatile memory device such as a flash memory or EEPROM (Electrically Erasable Programmable Read Only Memory). The storage unit 12 stores various programs to be executed by the processing unit 11 and data necessary for processing performed by the processing unit 11. In this embodiment, the storage unit 12 stores not only the program 12*a* to be executed by the processing unit 11 but also version correspondence information 12*b* as data necessary for execution of the program 12*a*. Note that the program 12*a* may be written to the storage unit 12 in the step of manufacturing the gateway 10, the gateway 10 may acquire the program 12*a* delivered by a remote server device or the like through communication, the gateway 10 may retrieve the program 12*a* recorded in a recording medium 101 such as a memory card or an optical disk and store the program in the storage unit 12, or a writing device may retrieve a program recorded in the recording medium 101 and write the program to the storage unit 12 of the gateway 10, for example. The program 12*a* may be delivered via a network, or may be recorded in the recording medium 101 and provided.

Figure 3:
FIG. 3 is a schematic diagram showing an example of version correspondence information of an on-board system.
Figure 3:

In this embodiment, the version correspondence information 12*b* is stored in the storage unit 12. Version correspondence information 12*b* includes correspondence between the system versions assigned to the on-board systems 2A and 2B provided in the vehicle 1 and the device versions assigned to the ECUs 2*a* to 2*e* included in the on-board systems 2A and 2B. FIG. 3 is a schematic diagram showing an example of the version correspondence information 12*b* of the on-board system 2A. As shown at the top in FIG. 3, the on-board system 2A includes two ECUs 2*a* and 2*b*. A system version 1 of the on-board system 2A is associated with the device version 1 of the ECU 2*a*, and with the device version 1 of the ECU 2*b* in the version correspondence information 12*b*. Also, the system version 2 of the on-board system 2A is associated with the device version 2 of the ECU 2*a*, and with the device version 1 of the ECU 2*b* in the version correspondence information 12*b*. Note that it is presumed that as the numerical values of the system version and the device version increase, a newer program is used, and a program with the newest version stored in the version correspondence information 12*b* is applied to the ECUs 2*a* to 2*e* of the vehicle 1.

When the gateway 10 acquires an update program from the server device 9 or the diagnostic tool 8, the gateway 10 acquires version information regarding the update program. Version information is shown in the middle in FIG. 3 which is acquired by the gateway 10 together with the update program for updating the ECU 2*a*, for example. Version information acquired by the gateway 10 includes the device version of the ECU 2*a* for which the update program is acquired as well as information regarding the system version of the on-board system 2A that includes the ECU 2*a*, and the device version of the other ECU 2*b* included in the on-board system 2A.

The gateway 10 that has acquired version information together with the update program from the server device 9 or the diagnostic tool 8 performs the update process using the update program, adds the acquired version information to the version correspondence information 12*b* of the storage unit 12, and stores the version information (see the bottom in FIG. 3). Note that, although the gateway 10 acquires version information with the same content as the update program for updating the ECU 2*b*, if the update program and the version information have the same content, the acquired version information may be discarded. Also, although this embodiment has a configuration in which version information acquired by the gateway 10 from the server device 9 or the diagnostic tool 8 includes the device versions of the plurality of ECUs 2*a* and 2*b* together with the system version, there is no limitation thereto, and a configuration may also be adopted in which version information includes the system version and the device version of one ECU 2*a* and does not include the device version of the other ECU 2*b*.

Also, the gateway 10 includes four communication units 13*a* to 13*d* in this embodiment. The communication units 13*a* to 13*d* are each connected to one of the communication lines 1*a* to 1*d* that constitute the in-vehicle network, and transmit and receive data according to a predetermined communication protocol. Although it is presumed that the communication units 13*a* to 13*d* transmit and receive data based on CAN communication standards in this embodiment, a communication standard other than CAN may also be applied. The communication units 13*a* to 13*d* transmit information by converting data provided by the processing unit 11 into an electric signal and outputting the electric signal to the communication lines 1*a* to 1*d*. The communication units 13*a* to 13*d* receive data by sampling the electrical potentials at the communication lines 1*a* to 1*d*, and supplies the thus received data to the processing unit 11. Note that the four communication units 13*a* to 13*d* provided in the gateway 10 may follow different communication protocols.

Also, the processing unit 11 executes the program 12a stored in the storage unit 12, and thereby enables software-like functional blocks such as an update process unit 11a, a version information acquisition unit 11b, an update execution determination unit 11c, and a relay processing unit 11d. The update process unit 11a updates the programs stored in the ECUs 2a to 2e by transmitting the update program acquired from the server device 9 or the diagnostic tool 8 to the ECUs 2a to 2e to be updated. The update process unit 11a periodically asks whether the programs in the ECUs 2a to 2e installed in the vehicle 1 need updating through communication with the server device 9 via the wireless communication device 3.

If an update is necessary, the update process unit 11a acquires the update program from the server device 9 and stores the acquired update program in the storage unit 12. Also, if the update process unit 11a receives a command for updating the programs of the ECUs 2a to 2e from the diagnostic tool 8 connected to the connector 4, the update process unit 11a acquires the update program from the diagnostic tool 8 and stores the acquired update program in the storage unit 12. Then, the update process unit 11a transmits the update program stored in the storage unit 12 to the communication line 1a or 1b connected to the ECUs 2a to 2e to be updated, and thereby causes the ECUs 2a to 2e to update the programs.

When the version information acquisition unit 11b acquires an update program from the server device 9 or the diagnostic tool 8, the version information acquisition unit 11b acquires version information regarding the update program. The version information acquisition unit 11b adds the version information acquired from the server device 9 or the diagnostic tool 8 to the version correspondence information 12b of the storage unit 12 and stores the version information in the storage unit 12.

The update execution determination unit 11c determines whether or not it is possible to update the ECUs 2a to 2e using the update program acquired from the server device 9 or the diagnostic tool 8. If the update program is provided by only one of the server device 9 and the diagnostic tool 8 and a request for updating the ECUs 2a to 2e is made, the update execution determination unit 11c determines that it is possible to perform an update process using this update program. If update process requests are made by the server device 9 and the diagnostic tool 8, the update execution determination unit 11c determines whether or not it is possible to perform both update processes in parallel based on the version correspondence information 12b stored in the storage unit 12. Also, if the update execution determination unit 11c has determined that it is impossible to perform update processes in parallel, the update execution determination unit 11c determines which update process is given priority.

The relay processing unit 11d relays data transmission and reception between the communication lines 1a to 1d by transmitting data received by any of the communication lines 1a to 1d, from the other communication lines 1a to 1d. The relay processing unit 11d need not relay all the received data, and determines whether or not the received data needs to be relayed, and decides where to relay the data, for example. The relay processing unit 11d transmits received data to be relayed to the communication lines 1a to 1d connected to a device that needs the data.

Figure 4:
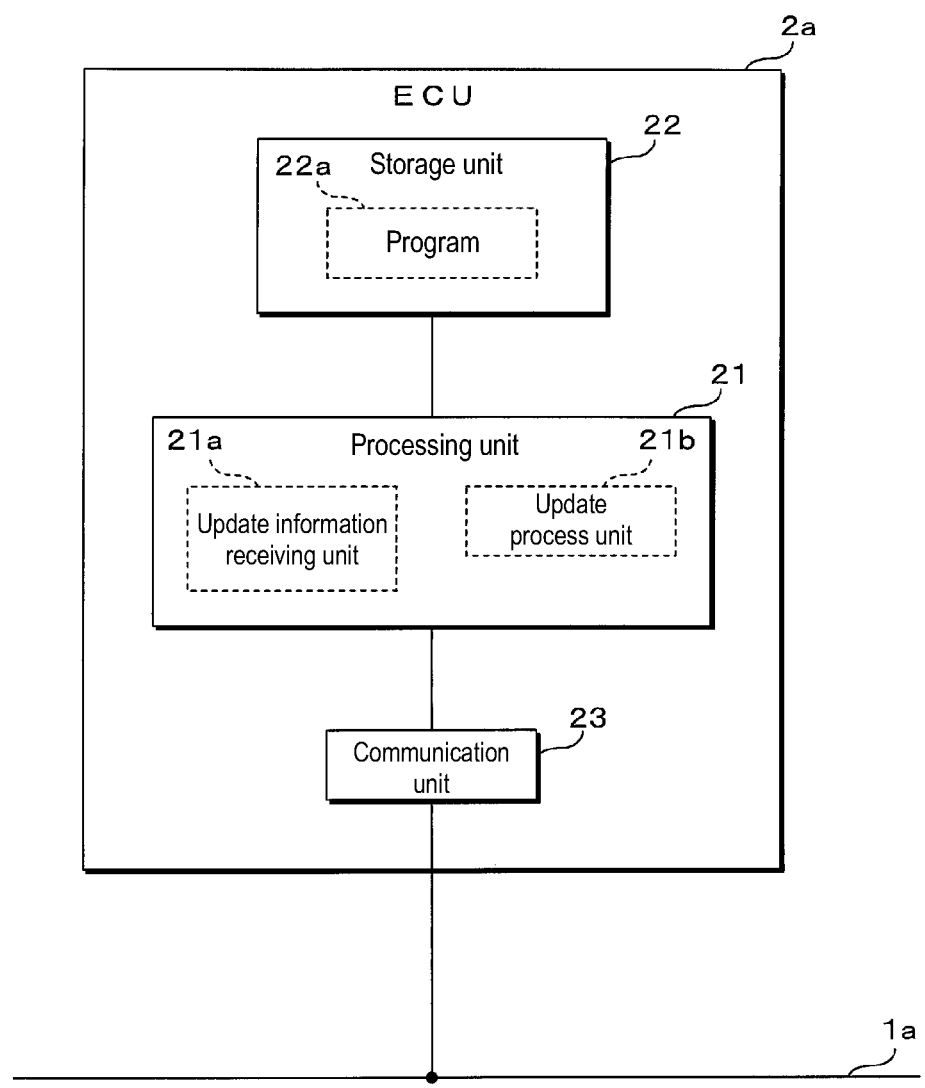
FIG. 4 is a block diagram showing a configuration of an ECU according to this embodiment.

FIG. 4 is a block diagram showing the configuration of the ECU 2a according to this embodiment. Note that, although FIG. 4 shows the configuration of one ECU2a out of the plurality of ECUs 2a to 2e installed in the vehicle 1, the other ECUs 2a to 2e also have the same configuration. Also, the block diagram shown in FIG. 4 focuses on the functional blocks common to the plurality of ECUs 2a to 2e, and omits the functional blocks that are different in the ECUs 2a to 2e. The ECU 2a according to this embodiment includes a processing unit (processor) 21, a storage unit (storage) 22, and a communication unit (transceiver) 23, for example. The processing unit 21 is constituted, for example, by an arithmetic processing unit such as a CPU or an MPU. The processing unit 21 performs various arithmetic operations by retrieving and executing a program 22a stored in the storage unit 22. Note that the content of the program 22a stored in the storage unit 22 changes for each of the ECUs 2a to 2e.

The storage unit 22 is constituted by a non-volatile memory device such as a flash memory or EEPROM. The storage unit 22 stores not only the program 22a to be executed by the processing unit 21 but also data necessary for execution of the program 22a. Note that the term "program 22a" may encompass the program 22a and the data necessary for execution of the program 22a hereinafter. The earliest program 22a may be written to the storage unit 22 in the step of manufacturing the ECU 2a, the ECU 2a may retrieve a program recorded in a recording medium such as a memory card or an optical disk and store the program in the storage unit 22, or a writing device may retrieve a program recorded in a recording medium and write the program to the storage unit 22 of the ECU 2a, for example. Note that, in this embodiment, after the ECU 2a is installed in the vehicle 1, the ECU 2a receives the update program from the gateway 10 via the communication line 1a, and the ECU 2a updates the program 22a stored in the storage unit 22 using the received update program.

In this embodiment, the storage unit 22 of the ECU 2a is provided with two areas for storing the program 22a. The two regions each have storage capacity sufficient for storing the program 22a. The processing unit 21 performs operation by retrieving the program 22a from one area of the storage unit 22, and the update program received from the gateway 10 is stored in the other area of the storage unit 22. After the ECU 2a has received all the update programs from the gateway 10, the ECU 2a updates the program 22a as a result of the processing unit 21 switching an area from which the program 22a is retrieved.

The communication unit 23 is connected with the communication line 1a that constitutes the in-vehicle network, and transmits and receives data according to, for example, a communication protocol such as CAN. The communication unit 23 transmits data by converting data provided by the processing unit 21 into an electric signal and outputting the electric signal to the communication line 1a. The communication unit 23 receives data by acquiring an electrical potential at the communication line 1a by sampling the electrical potential, and supplies the thus received data to the processing unit 21.

Also, the processing unit 21 of the ECU 2a according to this embodiment includes an update information receiving unit 21a and an update process unit 21b. The update information receiving unit 21a and the update process unit 21b are functional blocks for updating the program 22a stored in the storage unit 22. The update information receiving unit 21a and the update process unit 21b are software-like functional blocks that are enabled when the processing unit 21 executes a program (illustration omitted) different from the program 22a to be updated. The update information receiving unit 21a receives an update program transmitted via the communication line 1a or 1b via the communication unit 23, and stores the received update program in an unused area of the storage unit 22.

After the update process unit 21b has stored all the update programs in an unused area of the storage unit 22, the update process unit 21b switches the area of the storage unit 22 where the processing unit 21 executes the program 22a from the area in which the program 22a that is currently being executed is stored to an area in which the update program is stored. Accordingly, the processing unit 21 retrieves, from the storage unit 22, a new program 22a acquired from the gateway 10 as an update program and executes the program 22a, and thus an update of the program 22a is complete. After an update is complete, the ECU 2a may also delete data from the area of the storage unit 22 in which the previous program 22a is stored.

Update process

In the on-board update system 100 according to this embodiment, the server device 9 and the diagnostic tool 8 provide the gateway 10 with update programs for updating the ECUs 2a to 2e to, and request the gateway 10 to update the ECUs 2a to 2e. If only one of the server device 9 and the diagnostic tool 8 has requested the gateway 10 to perform an update process, the gateway 10 determines that it is possible to perform an update process relating to this request, and performs this update process.

In contrast, if both the server device 9 and the diagnostic tool 8 have requested the gateway 10 to perform update processes, the gateway 10 determines whether or not it is possible to perform both update processes. Note that "if both the server device 9 and the diagnostic tool 8 request the gateway 10 to perform update processes" may encompass the case where the server device 9 and the diagnostic tool 8 make requests simultaneously, the case where the diagnostic tool 8 makes another request after the server device 9 has made a request and before an update process relating to this request is complete, and the case where the server device 9 makes another request after the diagnostic tool 8 has made a request and before an update process relating to this request is complete.

If the on-board systems 2A or 2B that includes ECUs 2a to 2e for which the server device 9 requests an update is different from the on-board system 2A or 2B that includes ECUs 2a to 2e for which the diagnostic tool 8 requests an update, then the gateway 10 determines that it is possible to perform update processes relating to both update requests in parallel. If the gateway 10 has received from the server device 9 an update program for the ECU 2a in the on-board system 2A, and has received from the diagnostic tool 8 an update program for the ECU 2c in the on-board system 2B, the gateway 10 determines that it is possible to perform update processes using both update programs in parallel, and transmits the update program to the ECU 2a via the communication line 1a, and transmits the update program to the ECU 2c via the communication line 1b in parallel.

Figure 7:
FIG. 7 is a schematic diagram illustrating the determination of whether or not it is possible to perform an update process.

If the on-board systems 2A and 2B for which the server device 9 requests an update are the same as the on-board systems 2A and 2B for which the diagnostic tool 8 requests an update, and the ECUs 2a to 2e to be updated are different from each other, then the gateway 10 compares the system versions and the device versions included in the version information of the two update programs acquired from the server device 9 and the diagnostic tool 8 with the system versions of the on-board systems 2A and 2B and the device versions of the ECUs 2a to 2e at this point of time. FIGS. 5 to 7 are schematic diagrams illustrating a determination regarding whether or not it is possible to perform an update process, showing an example of version information if an update program for updating the ECU 2a in the on-board system 2A is received from the server device 9, and an update program for updating the ECU 2b in the on-board system 2A is received from the diagnostic tool 8. In all the examples in FIGS. 5 to 7, it is presumed that the system version of the on-board system 2A is 2, the device version of the ECU 2a is 2, and the device version of the ECU 2b is 1 before an update process is performed.

The example shown in FIG. 5 illustrates version correspondence information 12b if the server device 9 has provided an update program for updating the ECU 2a with a system version of 3 and a device version of 3, and the diagnostic tool 8 has provided an update program for updating the ECU 2b with a system version of 3 and a device version of 2. If the ECUs 2a and 2b are updated using the two update programs, both system versions of the updated ECUs 2a and 2b are 3. In this manner, with regard to a plurality of update programs provided by the server device 9 and the diagnostic tool 8, if the system versions of the plurality of update programs match, the gateway 10 determines that it is possible to perform update processes using these update programs in parallel.

Based on the results of determination, the gateway 10 transmits the update program to the ECU 2a and transmits the update program to the ECU 2b in parallel. However, because the ECUs 2a and 2b are connected to the same communication line 1a, the gateway 10 may transmit the update programs to the ECUs 2a and 2b in an alternating manner, or after the gateway 10 has transmitted the update program to one of the ECUs 2a and 2b, the gateway 10 may also transmit the update program to the other of the ECUs 2a and 2b, for example. The gateway 10 does not necessarily have to perform a plurality of update processes in parallel simultaneously, and may perform update processes substantially in parallel as described above.

The example shown in FIG. 6 illustrates version correspondence information 12b if the server device 9 has provided an update program for updating the ECU 2a with a system version of 3 and a device version of 3, and the diagnostic tool 8 has provided an update program for updating the ECU 2b with a system version of 4 and a device version of 3. In this example, the system version of the program for updating the ECU 2a is 3, whereas the system version of the program for updating the ECU 2b is 4, and thus their system versions do not match. If the system versions of a plurality of update programs do not match in this manner, the gateway 10 determines that it is impossible to perform update processes using these update programs in parallel.

If it is determined that it is impossible to perform update processes in parallel, the gateway 10 determines which update program needs to be given priority to perform the update process. The gateway 10 according to this embodiment gives priority to the update program for which the update process was requested first. If the gateway 10 is first requested by the server device 9 to update the ECU 2a, and is then requested by the diagnostic tool 8 to update the ECU 2b, the gateway 10 gives priority to the process for updating the ECU 2a first requested to perform an update process. After the process for updating the ECU 2a is complete, the gateway 10 may also update the ECU 2b, for example, or if the diagnostic tool 8 requests the gateway 10 to perform an update process again, the gateway 10 may also perform an update process without updating the ECU 2b, for example.

Alternatively, the gateway 10 may also give priority to an update process using an update program with a newer system version. That is, in the example shown in FIG. 6, the gateway 10 may give priority to the process for updating the ECU 2b because the system version of the program for updating the ECU 2b is newer. Note that, if the gateway 10 is requested to update the ECU 2b after starting to update the ECU 2a, for example, the gateway 10 may interrupt the process for updating the ECU 2a and update the ECU 2b.

Alternatively, it may be predetermined which of the server device 9 or the diagnostic tool 8 will be given priority, if the gateway 10 has determined that it is impossible to perform update processes in parallel. The gateway 10 may also be predetermined to give priority to an update request from the diagnostic tool 8, for example. In this case, the gateway 10 gives priority to the process for updating the ECU 2b in the example shown in FIG. 6. The gateway 10 may also be predetermined to give priority to an update request from the server device 9.

The example shown in FIG. 7 illustrates version correspondence information 12b if the server device 9 has provided an update program for updating the ECU 2a with a system version of 3 and a device version of 3, and the diagnostic tool 8 has provided an update program for updating the ECU 2b with a system version of 4 and a device version of 3. However, in this example, the device version of the ECU 2a corresponding to the system version 4 is 3, and the ECU 2a has the same device version when its system versions are 3 and 4. In such a case, the gateway 10 determines that it is possible to perform update processes using these update programs in parallel. That is, even if the system version of the program for updating the ECU 2a and the system version of the program for updating the ECU 2b do not match, if the device versions included in both system versions match, the gateway 10 may determine that it is possible to perform update processes in parallel. In other words, if the gateway 10 compares the system version of a program for updating the ECU 2a with the system version of a program for updating the ECU 2b, the gateway 10 need only compare the system version of the program for updating the ECU 2a with 3 or 4, and if the system version of the program for updating the ECU 2b is 3 or 4, then the gateway 10 need only determine that it is possible to perform update processes in parallel.

Flowchart

Figure 8:
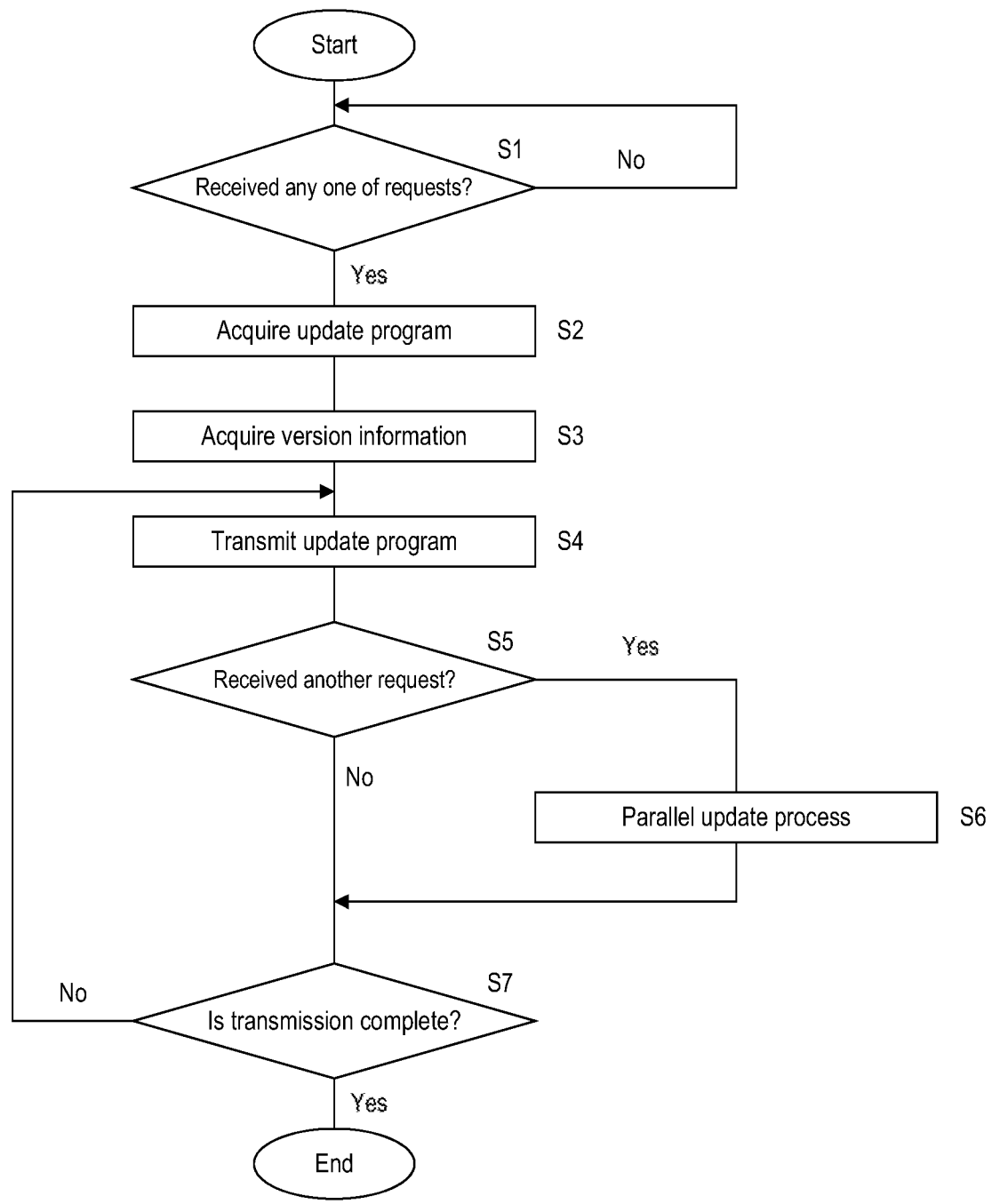
FIG. 8 is a flowchart of an update process, showing process steps performed by the gateway according to this embodiment.

FIG. 8 is a flowchart of an update process, showing process steps performed by the gateway 10 according to this embodiment. The update process unit 11a of the processing unit 11 of the gateway 10 according to this embodiment determines whether or not the update process unit 11a has received an update request from either the server device 9 or the diagnostic tool 8 (step S1). Note that the update process unit 11a periodically asks the server device 9, via the wireless communication device 3, whether any of the ECUs 2a to 2e needs updating, and if the update process unit 11a receives the response to this inquiry that one or more ECUs 2a to 2e need updating, the update process unit 11a determines that an update request has been received from the server device 9. Also, if the diagnostic tool 8 is connected to the connector 4 of the vehicle 1, and the diagnostic tool 8 provides the update process unit 11a with a command for updating the ECUs 2a to 2e, the update process unit 11a determines that the update request has been received from the diagnostic tool 8. If no update request has been received from the server device 9 or the diagnostic tool 8 (NO in step S1), the update process unit 11a waits until the update process unit 11a receives an update request from either the server device 9 or the diagnostic tool 8.

If an update request has been received from the server device 9 or the diagnostic tool 8 (YES in step S1), the update process unit 11a acquires an update program to be used in an update process by receiving the update program transmitted from the server device 9 or the diagnostic tool 8 that has transmitted the update request (step S2). Also, at this time, the version information acquisition unit 11b of the processing unit 11 acquires version information regarding this update program from the server device 9 or the diagnostic tool 8 that has transmitted the update program (step S3), and adds the version information to the version correspondence information 12b of the storage unit 12 and stores the version information in the storage unit 12.

The update process unit 11a transmits the update program acquired in step S2 to the ECUs 2a to 2e to be updated via the communication units 13a and 13b (step S4). Here, the update process unit 11a determines whether or not an update request has been received from the other of the server device 9 and the diagnostic tool 8 that has transmitted the update request in step S1 (step S5). If no other update request has been received (NO in step S5), then the update process unit 11a advances processing to step S7. If another update request has been received (YES in step S5), then the update process unit 11a starts a parallel update process for performing multiple update processes in parallel (step S6) and advances processing to step S7. Note that the processing unit 11 performs the parallel update process in step S6 in parallel with the processing shown in this flowchart.

Then, the update process unit 11a determines whether or not the transmission of the update programs to the ECUs 2a to 2e to be updated is complete (step S7). If the transmission of the update programs is not complete (NO in step S7), then the update process unit 11a returns processing to step S4, and continues the transmission of the update programs. If the transmission of the update programs is complete (YES in step S7), then the update process unit 11a ends the update processes relating to the update request received in step S1.

Figure 9:
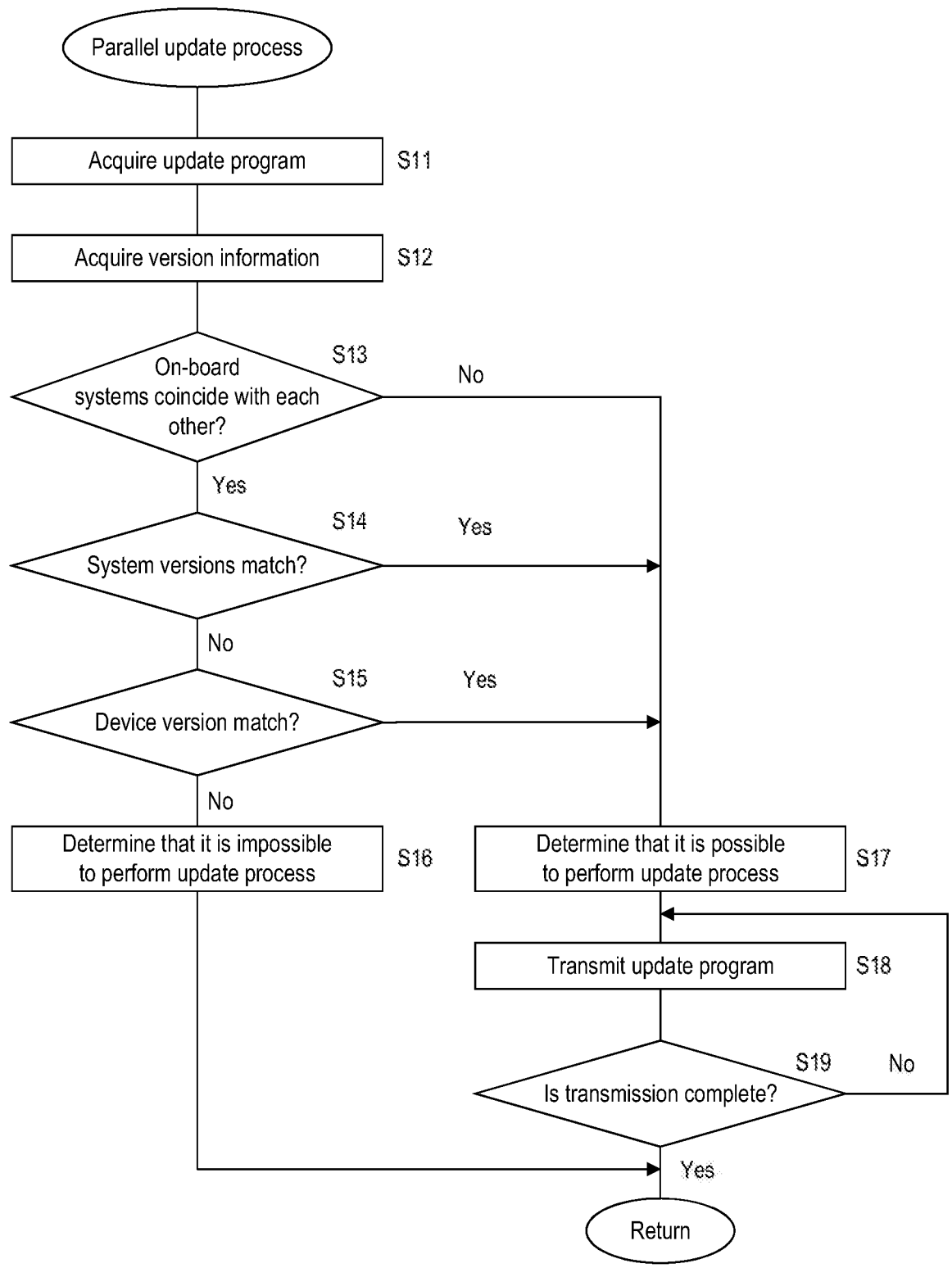
FIG. 9 is a flowchart of an update process, showing process steps performed by the gateway according to this embodiment.

FIG. 9 is a flowchart of an update process, showing process steps performed by the gateway 10 according to this embodiment, showing the parallel update process started in step S6 in the flowchart shown in FIG. 8 in detail. In step S6, the update process unit 11a that has started the parallel update process in step S6 acquires an update program from the server device 9 or the diagnostic tool 8 that has transmitted the update request received in step S5 (step S11). Also, at this time, the version information acquisition unit 11b acquires version information regarding this update program from the server device 9 or the diagnostic tool 8 that has transmitted the update program (step S12), and adds the acquired version information to the version correspondence information 12b of the storage unit 12 and stores the version information in the storage unit 12.

Then, the update execution determination unit 11c of the processing unit 11 compares the on-board systems 2A and 2B that are to be subjected to the update process that is already being performed (the update process shown in FIG. 8), with the on-board systems 2A and 2B that are to be subjected to an update process using the update program acquired in step S11, and the update execution determination unit 11c determines whether or not these on-board systems 2A and 2B coincide with each other (step S13). If these on-board systems 2A and 2B do not coincide with each other (NO in step S13), the update execution determination unit 11c determines that it is possible to perform an update process using the update program acquired in step S11 (step S17).

If these on-board systems 2A and 2B coincide with each other (YES in step S13), the update execution determination unit 11c compares, based on the version correspondence information 12b stored in the storage unit 12, the system version of the update program used in the update process that is already being performed, with the system version of the update program acquired in step S11, and determines whether or not their system versions match (step S14). If these system versions match (YES in step S14), the update execution determination unit 11c determines that it is possible to perform an update process using the update program acquired in step S11 (step S17).

If these system versions do not match (NO in step S14), the update execution determination unit 11c compares, based on the version correspondence information 12b stored in the storage unit 12, the device version of the update program acquired in step S11 corresponding to the system version of the update program used in the update process that is already being performed, with the device version of the update program acquired in step S11, and determines whether or not their device versions match (step S15). If these device versions match (YES in step S15), the update execution determination unit 11c determines that it is possible to perform an update process using the update program acquired in step S11 (step S17).

If these system versions do not match (NO in step S15), the update execution determination unit 11c determines that it is impossible to perform an update process using the update program acquired in step S11 (step S16). In this flowchart, it is presumed that, if it is determined that it is impossible to execute update processes in parallel, priority is given to the update process that is started first, and the update process unit 11a ends processing without performing update processes in parallel. However, the update process unit 11a may also be configured to give priority to an update process using an update program having a newer system version, if it is determined that it is impossible to execute update processes in parallel. In this case, the update process unit 11a may also determine which update program is newer by comparing the system versions after step S16, and perform an update process using the update program having the newer system version.

After it is determined that it is possible to perform update processes in parallel in step S17, the update process unit 11a transmits the update program acquired in step S11 to the ECUs 2a to 2e to be updated via the communication units 13a and 13b (step S18). The update process unit 11a determines whether or not the transmission of the update programs to the ECUs 2a to 2e to be updated is complete (step S19). If the transmission of the update programs is not complete (NO in step S19), then the update process unit 11a returns processing to step S18, and continues the transmission of the update programs. If the transmission of the update programs is complete (YES in step S19), then the update process unit 11a ends the update process using the update program acquired in step S11.

Figure 10:
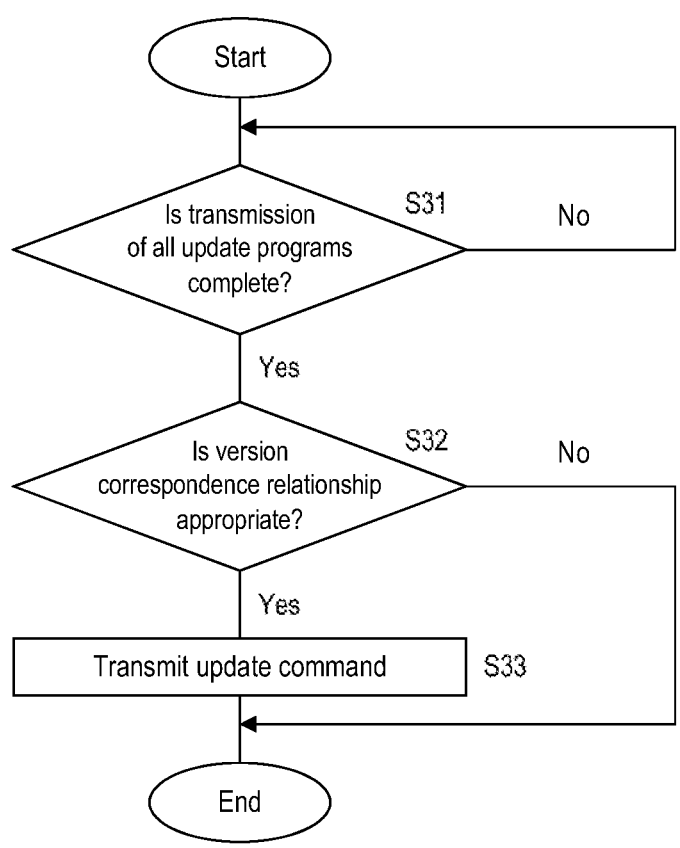
FIG. 10 is a flowchart of an update process, showing process steps performed by the gateway according to this embodiment.

FIG. 10 is a flowchart of an update process, showing process steps performed by the gateway 10 according to this embodiment, the update process being performed after the processes shown in FIGS. 8 and 9. The update process unit 11a of the gateway 10 according to this embodiment determines whether or not transmission of all the update programs, to the ECUs 2a to 2e, which relate to the update request provided by the server device 9 or the diagnostic tool 8 is complete (step S31). If the transmission of all the update programs is not complete (NO in step S31), then the update process unit 11a continues the transmission of the update programs until the transmission of all the update programs is complete.

If the transmission of all the update programs is complete (YES in step S31), then the update process unit 11a determines, based on the version correspondence information 12b stored in the storage unit 12 and the current versions of the ECUs 2a to 2e, whether or not the system versions of the on-board systems 2A and 2B to be updated and the device versions of the ECUs 2a to 2e included in these on-board systems 2A and 2B have an appropriate correspondence relationship (step S32). If the system versions and the device versions have an appropriate correspondence relationship (YES in step S32), the update process unit 11a transmits, to the ECUs 2a to 2e included in the on-board systems 2A and 2B that have been updated, an update command for updating each ECU (step S33) using an update program, and ends processing. If the system versions and the device versions do not have an appropriate correspondence relationship (NO in step S32), then the update process unit 11a ends processing without transmitting an update command in order to wait for a further update process being performed.

Figure 11:
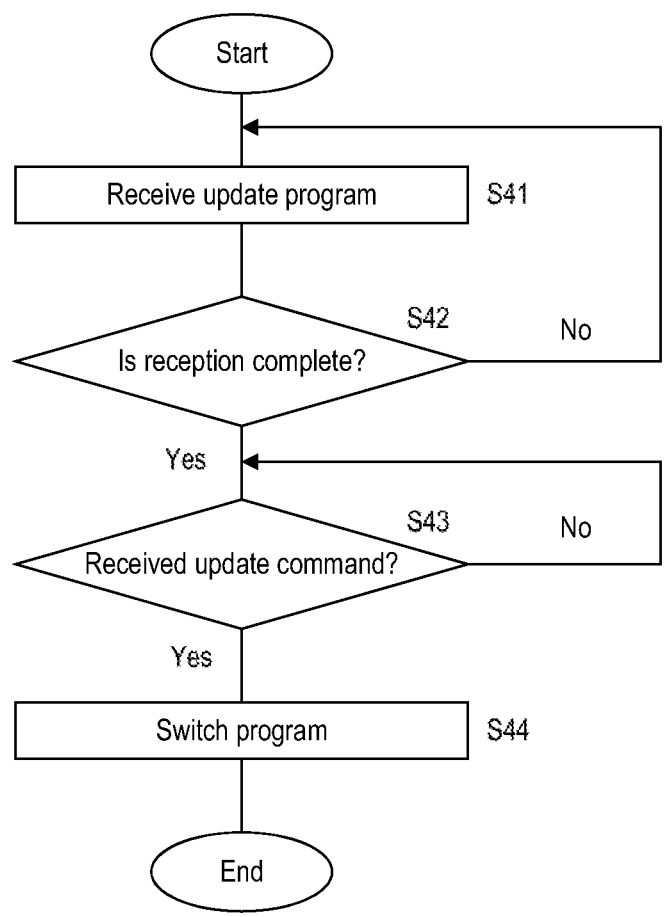
FIG. 11 is a flowchart of an update process, showing process steps performed by an ECU according to this embodiment.

FIG. 11 is a flowchart of an update process, showing process steps performed by the ECUs 2a to 2e according to this embodiment. The update information receiving units 21a of the processing units 21 of the ECUs 2a to 2e according to this embodiment receive update programs transmitted from the gateway 10 via the communication units 23 (step S41), and stores the update programs in the storage unit 22. The update information receiving unit 21a determines whether or not the reception of all the update programs is complete (step S42). If the reception of the update programs is not complete (NO in step S42), then the update information receiving unit 21a returns processing to step S41, and continues the reception of the update programs.

If the reception of the update programs is complete (YES in step S42), then the update process unit 21b of the processing unit 21 determines whether or not an update command transmitted from the gateway 10 has been received (step S43). If no update command has been received (NO in step S43), the update process unit 21b waits until an update command is received. If an update command has been received (YES in step S43), then the update process unit 21b switches the program 22a executed by the processing unit 21 from the program 22a that is currently being executed, to the update program received from the gateway 10 (step S44), and ends the update process.

Summary

In the on-board update system 100 having the above-described configuration according to this embodiment, the gateway 10 updates the programs 22a of the plurality of ECUs 2a to 2e installed in the vehicle 1. The gateway 10 can communicate with devices outside the vehicle 1, such as the server device 9 and the diagnostic tool 8, through a plurality of communication paths through wireless communication utilizing the wireless communication device 3 and wired communication via the connector 4. The gateway 10 receives programs for updating the ECUs 2a to 2e from the server device 9 or the diagnostic tool 8, and transmits the update programs to the ECUs 2a to 2e through in-vehicle communication, and thereby the ECUs 2a to 2e update the programs 22a stored in the storage units 22.

The gateway 10 acquires version information together with an update program from the server device 9 or the diagnostic tool 8. If different update programs have been received from the server device 9 and the diagnostic tool 8, the gateway 10 determines whether or not it is possible to perform update processes using the update programs, based on the version information. If it is determined that it is possible to perform update processes using a plurality of update programs, the gateway 10 performs update processes using these update programs in parallel.

Accordingly, if a plurality of update programs have been received from different external devices, the gateway 10 can appropriately determine whether or not it is possible to perform update processes using update programs, based on the version information, and can perform the plurality of update processes in parallel. Also, in the on-board update system 100 according to this embodiment, version information acquired by the gateway 10 from the server device 9 or the diagnostic tool 8 together with the update programs includes system versions assigned to the on-board systems 2A and 2B that include, as a group, the plurality of ECUs 2*a* to 2*e* that operate together, and the device versions that are respectively assigned to the ECUs 2*a* to 2*e*. The gateway 10 stores a correspondence relationship between the system versions and the device versions in the storage unit 12 as the version correspondence information 12*b*. Accordingly, the gateway 10 can appropriately find out the correspondence relationship between the system versions and device versions, and appropriately determine whether or not it is possible to perform an update process using an update program.

Also, if a plurality of update programs provided by the server device 9 or the diagnostic tool 8 are used to update the ECUs 2*a* to 2*e* included in different on-board systems 2A and 2B, the gateway 10 performs update processes using these update programs in parallel. Because there is no version dependency between the ECUs 2*a* to 2 included in different on-board systems 2A and 2B, it is possible to perform update processes in parallel regardless of the system versions and the device versions.

Also, if a plurality of update programs provided by the server device 9 or the diagnostic tool 8 are used to update the ECUs 2*a* to 2*e* included in shared on-board systems 2A and 2B, the gateway 10 compares the system versions of the update programs. If a plurality of update programs have the same system version, the gateway 10 performs update processes using these update programs in parallel. Because the programs 22*a* executed by the plurality of ECUs 2*a* to 2*e* included in the shared on-board systems 2A and 2B preferably have the same system version, the gateway 10 can determine that it is possible to perform update processes in parallel with regard to the update programs having the same system version.

Also, if a plurality of update programs provided by the server device 9 and the diagnostic tool 8 have different system versions, the gateway 10 gives priority to an update process using an update program with which the update process has been started first, and determines that it is impossible to perform an update process using the update program that has been received later. Accordingly, the gateway 10 can prevent failure and the like caused as a result of the update process that has already been started being forcibly terminated during the update process.

Alternatively, if a plurality of update programs provided by the server device 9 and the diagnostic tool 8 have different system versions, the gateway 10 may give priority to an update process using an update program having the newest system version, and determine that it is impossible to perform an update process using the other update program. Accordingly, the gateway 10 can update the programs 22*a* of the ECUs 2*a* to 2*e* to programs with the newest system version.

Also, even if a plurality of update programs provided by the server device 9 and the diagnostic tool 8 have different system versions and these update programs are to be determined that it is impossible to perform update processes in parallel, if the device version of an update program is the same as the device version corresponding to the system version of an update program determined to give priority to perform the update process, the gateway 10 according to this embodiment determines that it is possible to perform update processes using the update programs in parallel. In an exceptional case where a plurality of update programs have the same corresponding device version even if the update programs have different system versions, it is possible to more efficiently perform update processes as a result of the gateway 10 determining that it is possible to perform the update processes in parallel.

Note that, although it is presumed that devices whose programs or data is to be updated are the ECUs 2*a* to 2*e* in this embodiment, there is no limitation thereto, and a configuration may also be adopted in which programs or data regarding various on-board devices other than the ECUs 2*a* to 2*e* are updated. Also, although it is presumed that in the on-board update system 100, a device for updating the ECUs 2*a* to 2*e* is the gateway 10, there is no limitation thereto, and one of the ECUs 2*a* to 2*e* may be configured to acquire and transmit data for updating the other ECUs 2*a* to 2*e*, or various devices other than the gateway 10 and the ECUs 2*a* to 2*e* may be configured to perform an update process, for example. Also, although it is presumed that devices for transmitting an update program to the vehicle 1 are the server device 9 and the diagnostic tool 8, there is no limitation thereto, and the other device may be configured to transmit an update program to the vehicle 1 through wired or wireless communication.

Also, although the gateway 10 is configured to communicate with the server device 9 using the wireless communication device 3, there is no limitation thereto, and a configuration may also be adopted in which the gateway 10 has the function of wireless communication. Also, although the gateway 10 is configured to perform wired communication with the diagnostic tool 8 via the connector 4, there is no limitation thereto, and a configuration may also be adopted in which the gateway 10 performs wireless communication such as wireless LAN or Bluetooth (registered trademark), for example.

Note that an update process in this embodiment may encompass not only updates of programs executed by the ECUs 2*a* to 2*e* but also processes for updating data used in processes performed by executing programs, and processes for updating only data without updating a program code (command). An "update program" may include only code of a program to be updated, include code of a program and data, and include only data without code of a program.

The devices in an on-board update system each include a computer that includes a microprocessor, a ROM, a RAM, and the like. An arithmetic processing unit such as a microprocessor retrieves a computer program that include part or all of the steps of the sequence diagram or the flowchart shown in FIGS. 8 to 11 from a storage unit such as a ROM or RAM and executes the computer program. The computer programs of these multiple devices can be each installed from an external server device, or the like. Also, the computer programs of these multiple devices are each stored in a recording medium such as a CD-ROM, a DVD-ROM, a semiconductor memory, or the like, and then the resulting medium is distributed.

The embodiments that were disclosed here are to be considered in all aspects to be illustrative and not restrictive. The scope of the present disclosure is defined by the claims and not by the above description, and all changes that come within the meaning and range of equivalency of the claims are intended to be embraced therein.

1 Vehicle
1a to 1d Communication line
2a to 2e ECU
2A, 2B On-board system
3 Wireless communication device
4 Connector
8 Diagnostic tool
8a Communication cable
9 Server device
10 Gateway (on-board update device)
11 Processing unit
11a Update process unit
11b Version information acquisition unit
11c Update execution determination unit (execution determination unit)
11d Relay processing unit
12 Storage unit
12a Program
12b Version correspondence information
13a, 13b Communication unit (in-vehicle communication unit)
13c, 13d Communication unit (external communication unit)
21 Processing unit
21a Update information receiving unit
21b Update process unit
22 Storage unit
22a Program
23 Communication unit
100 On-board update system
101 Storage medium

The invention claimed is:

1. An on-board update device comprising:
a plurality of external communication units configured to communicate with a device outside a vehicle;
an in-vehicle communication unit configured to communicate with a plurality of on-board devices installed in the vehicle;
an update process unit configured to receive, from the external device and via the external communication unit, an update program for updating a program that is stored in a storage unit of the on-board device, and to transmit the update program via the in-vehicle communication unit to the on-board device; and
an execution determination unit configured to determine, if the plurality of update programs respectively received from different external devices via a plurality of the external communication units are different, based on version information of the plurality of update programs, whether or not it is possible to perform an update process for the program stored in the storage unit using each respective one of the plurality of update programs,
wherein, if the execution determination unit has determined that it is possible to perform update processes with regard to a plurality of update programs, the update process unit performs update processes using the plurality of update programs in parallel; and
wherein the version information includes a system version assigned to an on-board system including, as one group, a plurality of on-board devices that operate together, and device versions that are respectively assigned to the on-board devices,
the on-board update device comprises a storage unit configured to store a correspondence relationship between the system version and the device versions, and
if a plurality of update programs are used to update on-board devices included in different on-board systems, the execution determination unit determines that it is possible to perform update processes using the plurality of update programs.

2. The on-board update device according to claim 1, wherein the execution determination unit is configured to determine that it is possible to perform update processes using a plurality of update programs having the same system version.

3. The on-board update device according to claim 2, wherein, with regard to a plurality of update programs having different system versions, the execution determination unit is configured to give priority to an update process using one update program with which the update process has been started first, and to determine that it is impossible to perform update processes using the other update programs.

4. The on-board update device according to claim 2, wherein, with regard to a plurality of update programs having different system versions, the execution determination unit is configured to give priority to an update process using one update program having the newest system version, and to determine that it is impossible to perform update processes using the other update programs.

5. The on-board update device according to claim 1, wherein, with regard to a plurality of update programs having different system versions, the execution determination unit is configured to give priority to an update process using one update program with which the update process has been started first, and to determine that it is impossible to perform update processes using the other update programs.

6. The on-board update device according to claim 5, wherein, if device versions of the other update programs are the same as a device version corresponding to the system version for which priority is given to perform an update process, the execution determination unit determines that it is possible to perform update processes using the other update programs in parallel.

7. The on-board update device according to claim 1, wherein, with regard to a plurality of update programs having different system versions, the execution determination unit is configured to give priority to an update process using one update program having the newest system version, and to determine that it is impossible to perform update processes using the other update programs.

8. The on-board update device according to claim 7, wherein, if device versions of the other update programs are the same as a device version corresponding to the system version for which priority is given to perform an update process, the execution determination unit determines that it is possible to perform update processes using the other update programs in parallel.

9. An update process method for receiving, from a device outside a vehicle, an update program for updating a program that is stored in a storage unit of an on-board device, and for transmitting the received update program to the on-board device, the method comprising:
- determining, if the update programs are respectively received from different external devices are different from each other, based on version information of the update programs, whether or not it is possible to perform an update process using each update program, wherein the version information includes a system version assigned to an on-board system including, as one group, a plurality of on-board devices that operate together, and device versions that are respectively assigned to the on-board devices, the on-board update device comprises a storage unit configured to store a correspondence relationship between the system version and the device versions, and
- performing, if a plurality of update programs are used to update on-board devices included in different on-board systems, update processes using the plurality of update programs in parallel.

10. An update process program product comprising a non-volatile memory storing instructions for causing a computer to perform processing for receiving, from a device outside a vehicle, an update program for updating a program that is stored in a storage unit of an on-board device, and for transmitting the received update program to the on-board device, the program product causing the computer to perform processing for the following steps:
- determining, if the update programs are respectively received from different external devices are different from each other, based on version information of the update programs, whether or not it is possible to perform an update process using each update program, wherein the version information includes a system version assigned to an on-board system including, as one group, a plurality of on-board devices that operate together, and device versions that are respectively assigned to the on-board devices;
- storing in the storage unit of the on-board device a correspondence relationship between a system version and a device version; and
- performing, if it is determined that it is possible to perform update processes with regard to a plurality of update programs, update processes using the plurality of update programs in parallel; wherein if a plurality of update programs are used to update on-board devices included in different on-board systems, the execution determination unit determines that it is possible to perform update processes using the plurality of update programs.

* * * * *